(12) United States Patent
de Waal

(10) Patent No.: US 11,064,042 B2
(45) Date of Patent: *Jul. 13, 2021

(54) PROXY SERVER TO HANDLE WEBHOOK CALLBACKS

(71) Applicant: Hint, Inc., Pleasanton, CA (US)

(72) Inventor: Abraham Benjamin de Waal, Pleasanton, CA (US)

(73) Assignee: Hint, Inc., Newark, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/539,354

(22) Filed: Aug. 13, 2019

(65) Prior Publication Data

US 2020/0106851 A1 Apr. 2, 2020

Related U.S. Application Data

(63) Continuation of application No. 16/147,306, filed on Sep. 28, 2018, now Pat. No. 10,425,497.

(51) Int. Cl.
*G06F 15/16* (2006.01)
*H04L 29/08* (2006.01)

(52) U.S. Cl.
CPC .......... *H04L 67/2842* (2013.01); *H04L 67/02* (2013.01); *H04L 67/146* (2013.01); *H04L 67/2871* (2013.01)

(58) Field of Classification Search
CPC ......... H04L 67/02; H04L 67/20; H04L 67/22; H04L 67/26; H04L 67/28; H04L 67/146; H04L 67/2842; H04L 67/2871
See application file for complete search history.

(56) References Cited

U.S. PATENT DOCUMENTS

| 10,425,497 | B1* | 9/2019 | de Waal | G06F 9/455 |
| 2004/0078486 | A1* | 4/2004 | Salahshoor | H04L 67/02 709/245 |
| 2010/0125624 | A1 | 5/2010 | Bachhuber-Haller et al. | |

(Continued)

FOREIGN PATENT DOCUMENTS

EP 3296862 A1 3/2018

OTHER PUBLICATIONS

"U.S. Appl. No. 16/147,306, Non Final Office Action dated Mar. 21, 2019", 9 pgs.

(Continued)

*Primary Examiner* — Yves Dalencourt
(74) *Attorney, Agent, or Firm* — Schwegman Lundberg & Woessner, P.A.

(57) ABSTRACT

A proxy server has a proxy callback interface to receive a webhook call from a callback producer server of a web service, the webhook call including a webhook channel address and payload callback data. A proxy server database stores a callback record comprising the payload callback data in a proxy server database. A query interface receives a callback query from a callback consumer server, the callback query identifying the webhook channel address. The query interface further configured to identify a plurality of callback records associated with the webhook channel address stored within the proxy server database after receipt of a previous callback query from the callback consumer server, and return the plurality of callback records to the callback client responsive to the callback query.

16 Claims, 7 Drawing Sheets

(56) References Cited

U.S. PATENT DOCUMENTS

2011/0271289 A1 11/2011 Weiser et al.
2014/0274086 A1 9/2014 Boerjesson et al.
2017/0346853 A1 11/2017 Wyatt et al.
2018/0115595 A1 4/2018 Krishnan et al.

OTHER PUBLICATIONS

"U.S. Appl. No. 16/147,306, Notice of Allowance dated Jul. 1, 2019", 8 pgs.
"U.S. Appl. No. 16/147,306, Response filed Jun. 21, 2019 to Non Final Office Action dated Mar. 21, 2019", 13 pgs.
"Webhook", Wikipedia, [Online]. Retrieved from the Internet: <URL: https://en.wikipedia.org/wiki/Webhook>, (Accessed Mar. 9, 2018), 1 pg.

* cited by examiner

PROXY SERVER TO HANDLE WEBHOOK CALLBACKS

CROSS-REFERENCE TO RELATED APPLICATION

This application is a continuation of U.S. patent application Ser. No. 16/147,306, filed Sep. 28, 2018, which is incorporated by reference herein in its entirety.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Glossary

Figure 1:
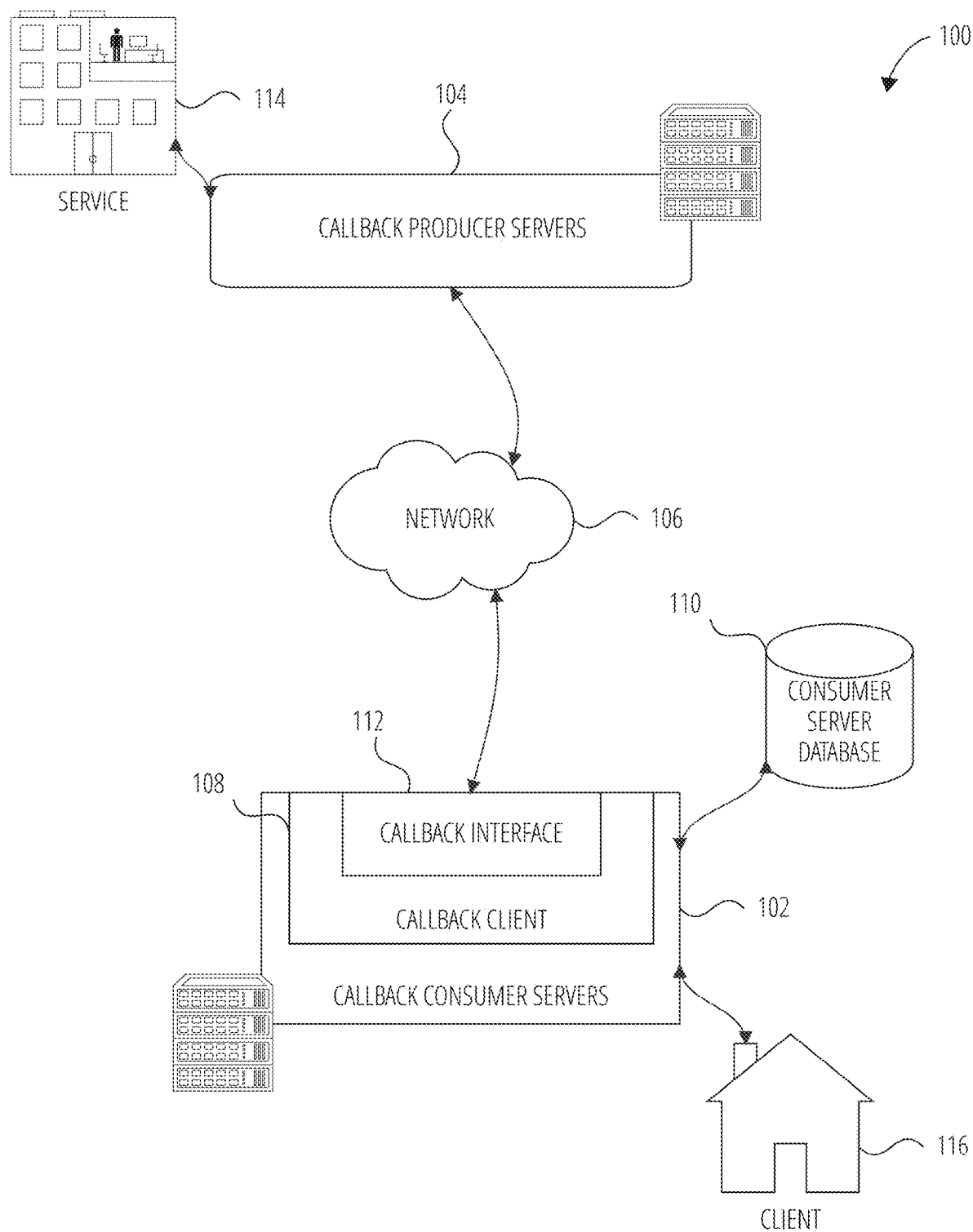
FIG. 1 illustrates an environment 100 in accordance with one embodiment.

"Computer-Readable Medium" in this context refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Processor" in this context refers to any circuit or virtual circuit (a physical circuit emulated by logic executing on an actual processor) that manipulates data values according to control signals (e.g., "commands", "op codes", "machine code", etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC) or any combination thereof. A processor may further be a multi-core processor having two or more independent processors (sometimes referred to as "cores") that may execute instructions contemporaneously.

"Carrier Signal" in this context refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

"Module" in this context refers to logic having boundaries defined by function or subroutine calls, branch points, application program interfaces (APIs), or other technologies that provide for the partitioning or modularization of particular processing or control functions. Modules are typically combined via their interfaces with other modules to carry out a machine process. A module may be a packaged functional hardware unit designed for use with other components and a part of a program that usually performs a particular function of related functions. Modules may constitute either software modules (e.g., code embodied on a machine-readable medium) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein. In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a Field-Programmable Gate Array (FPGA) or an Application Specific Integrated Circuit (ASIC). A hardware module may also include programmable logic or circuitry that is temporarily configured by software to perform certain operations. For example, a hardware module may include software executed by a general-purpose processor or another programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) may be driven by cost and time considerations. Accordingly, the phrase "hardware module" (or "hardware-implemented module") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time. Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information). The various operations of example methods and routines described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors. Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)). The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

"Machine-Storage Medium" in this context refers to a single or multiple storage devices and/or media (e.g., a centralized or distributed database, and/or associated caches and servers) that store executable instructions, routines and/or data. The term shall accordingly be taken to include, but not be limited to, solid-state memories, and optical and magnetic media, including memory internal or external to processors. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Signal Medium" in this context refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

"Communication Network" in this context refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network, and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Webhook" in this context refers to a method of augmenting or altering the behavior of a web page, or web application, with custom callbacks. These callbacks may be maintained, modified, and managed by third-party users and developers who may not necessarily be affiliated with the originating website or application.

Description

FIG. 1 is a schematic diagram showing an example networked environment 100 in which a client 116 operates callback consumer servers 102, which host a callback client 108, that in turn provides a callback interface 112 in the form of a callback web endpoint. A service 114 operates callback producer servers 104, which notify the callback interface 112 of events via a network 106 (e.g., the Internet).

Web services often so-called "webhooks" to allow asynchronous notification to clients. For example, the service 114 (e.g., a banking service provided by a bank) may allow the client 116 (e.g., a banking client such as the payment processor) to register a callback web endpoint with the service 114, which the service 114 can then use to notify the client of certain events (e.g., when a banking transaction has been cleared, or alternatively denied). In this case, the client 116 listens on the endpoint and processes events as they are received from the from the service 114.

A number of technical problems exist with webhooks as they are used today. First, webhooks tend to be ephemeral in nature, in that when a client (e.g., the callback client 108) accepts a callback, the server (e.g., the callback producer servers 104) will not repeat notification of the event again. If the callback client 108 fails and loses the notification message, retrieval is difficult if not impossible.

Further, when a state of the client (e.g., the callback client 108) is restored from backup, none of the events that may have occurred since the backup was made will be replayed from the server. This makes it practically very difficult to back up clients reliably.

Further, if there are bugs present in a client, it is technically very difficult to replay events (e.g., the receipt of a notification message from the callback producer servers 104) to debug the client or recover events.

Further, webhooks typically provide only a single endpoint for event notification messages received from a notification producer such as the callback producer servers 104. Event notification messages are sent to one place, and one place only-namely the registered endpoint provided by the callback interface 112. A single endpoint may prove problematic if a burst of callbacks is received by a callback server.

A further technical challenge is that certain callback endpoints are difficult for a producer to reach and deliver an event notification message. This is because it is common for callback consumer servers 102, for example, to be located behind a corporate firewall and workarounds may either be secure or unreliable. Good production servers typically also run behind firewalls. Often ports of such production servers are open to a lower well-known callback producer servers 104 to access the relevant production servers, but this increases the security risk as a result of the attack surface being expanded.

Figure 2:
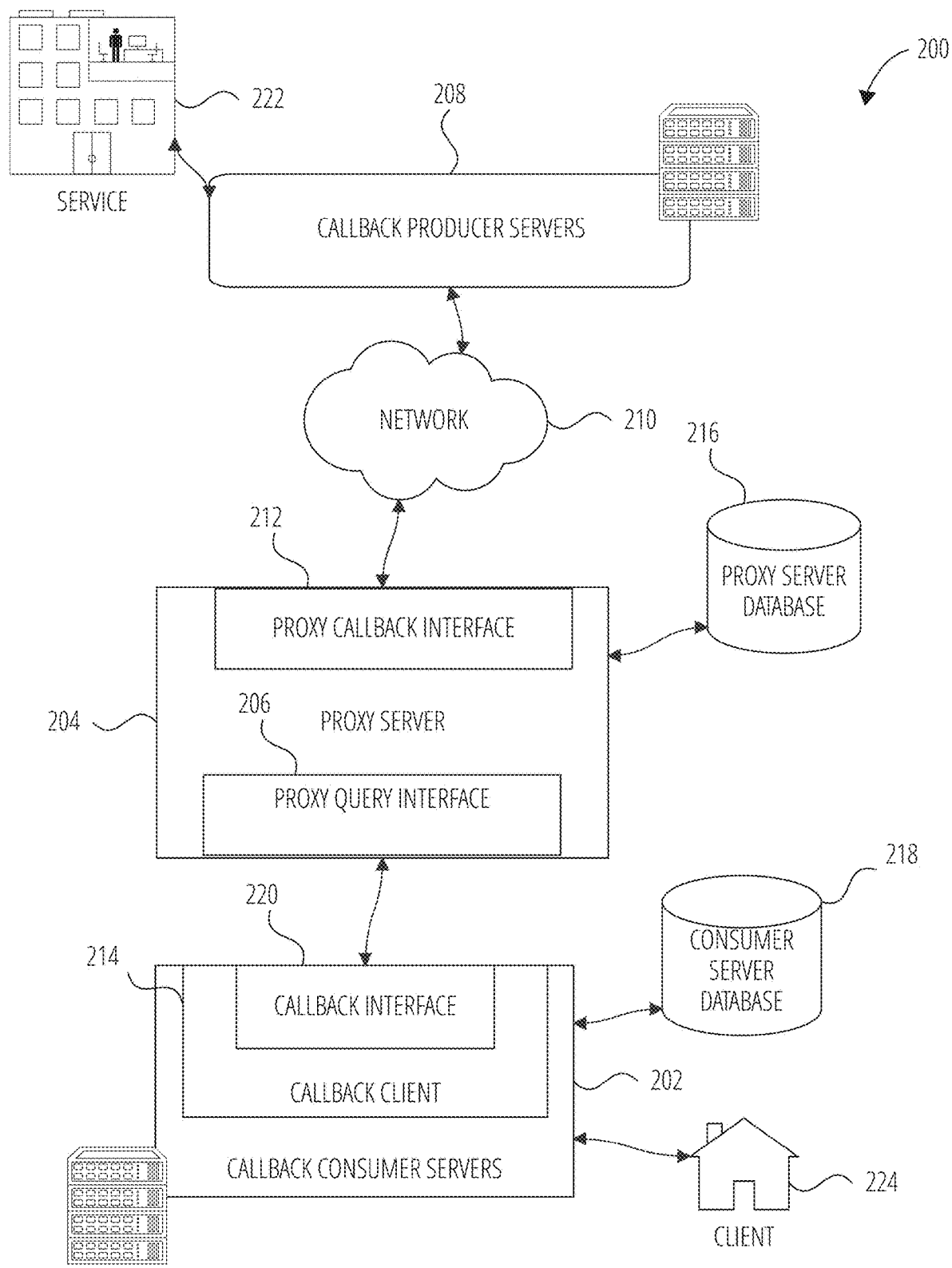
FIG. 2 illustrates an environment 200 in accordance with one embodiment.

FIG. 2 is a schematic diagram showing a further example networked environment 200, in which a client 224 operates callback consumer servers 202, which in turn each host a callback client 214. The callback client 214 provides a callback interface 220. Similarly, to the example shown in FIG. 1, a service 222 operates callback producer servers 208.

Different from the example shown in FIG. 1, a proxy server 204 is located between the callback consumer servers 202 and callback producer servers 208. The proxy server 204 includes a proxy callback interface 212 that provides multiple callback web endpoints, each of which is accessible to a service 222 that operates the callback producer servers 208. Operationally, the callback producer servers 208 notify the proxy callback interface 212 of events via a network 210 and using one of the callback web endpoints, or webhooks, supported by the proxy callback interface 212. Each of these callback web endpoints may be regarded as a separate channel namespace that is supported by the relevant proxy server 204. The notifications received by the proxy server 204 are typically labeled "callbacks," and include both a network address (e.g., URL) of the callback web endpoint (or channel) as well as a payload.

The proxy server 204 processes a callback by extracting the payload, and storing the payload, together with additional information (e.g., a channel identifier, sequence number, etc.) within a proxy server database 216.

The callback client 214, executing on the callback consumer servers 202, then queries a proxy query interface 206 of the proxy server 204, via a callback interface 220, in order to retrieve data from the proxy server database 216. Further information regarding the above-described processes and architecture are described with reference to other figures included herein.

Figure 3:
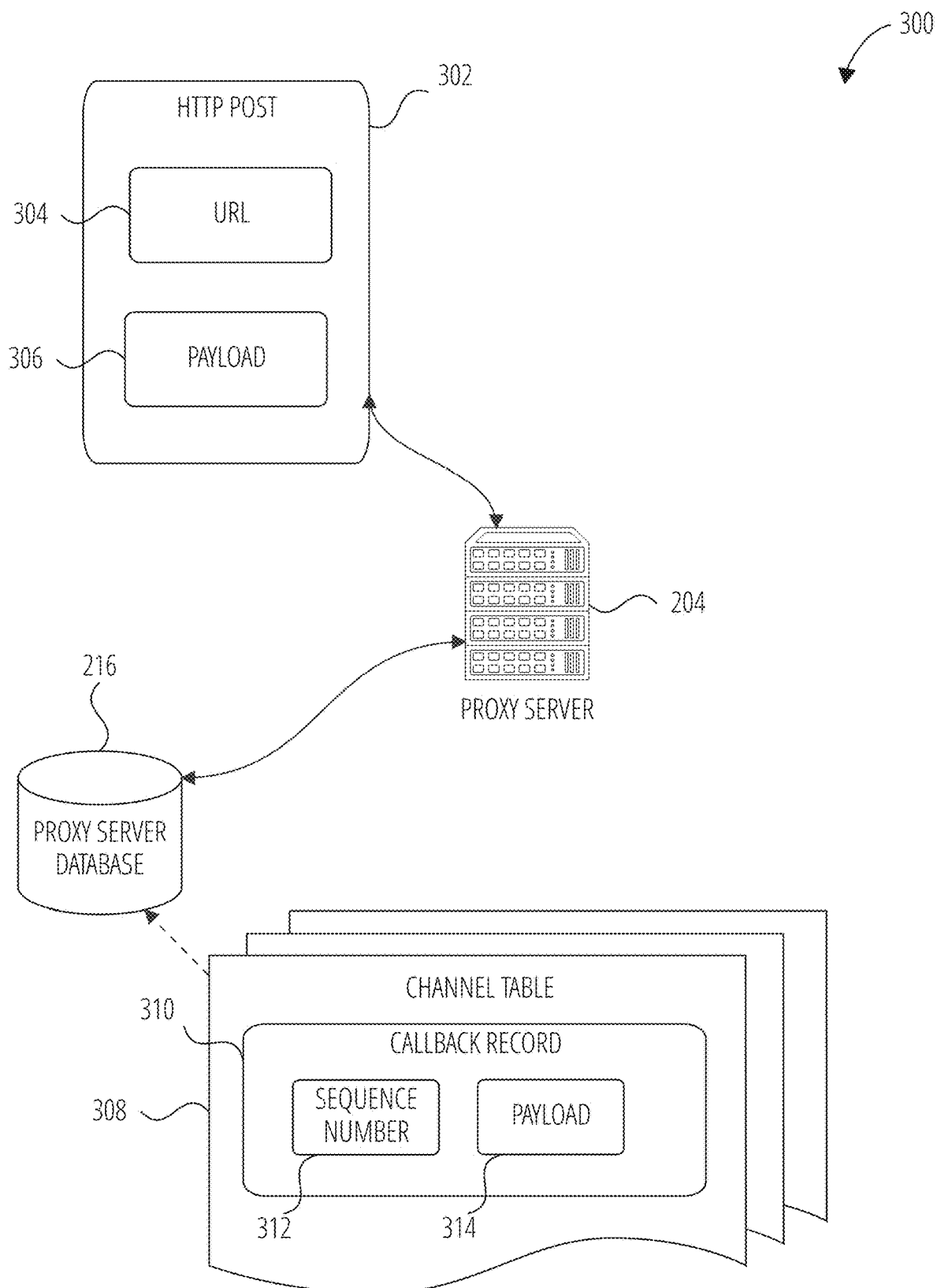
FIG. 3 illustrates a data structures 300 in accordance with one embodiment.

FIG. 3 is a schematic diagram illustrating further details of data that is communicated between the various components and entities. Specifically, a callback (or webhook call) in the form of an HTTP post request 302 is shown to include both a webhook channel address (or webhook channel identifier) in the form of a URL 304 (e.g., sample.com/webhook/production/cardx) and payload callback data in the form of a payload 306 (e.g., credit card information). The HTTP post request 302 is shown to be received at a webhook channel identified by the URL 304 at the proxy server 204. A callback record 310 is then created based on the HTTP post request 302, and written into the proxy server database 216. Specifically, the callback record 310 is written into a channel table 308 associated with the webhook channel identified by the URL 304 Accordingly, each webhook channel supported by the proxy server database 216, in one example embodiment, has a dedicated channel table 308. The callback record 310, in addition to including the payload 314 extracted from the HTTP post request 302, is assigned a sequence number 312 based on the sequence in which the HTTP post request 302 was received at the relevant webhook channel.

In another embodiment, as opposed to having a dedicated channel table 308 for each webhook channel, each callback record 310 may be written into the proxy server database 216 with a webhook channel identifier that uniquely identifies the respective webhook channel on which the HTTP post request 302 was received. Accordingly, a single table may be used to store multiple instances of callback record 310, received on multiple webhook channels. In one embodiment, a webhook channel identifier may be the URL 304 of the web channel (or a derivative, such as a hash function, of the relevant URL 304) on which the 302 was received.

Figure 4:
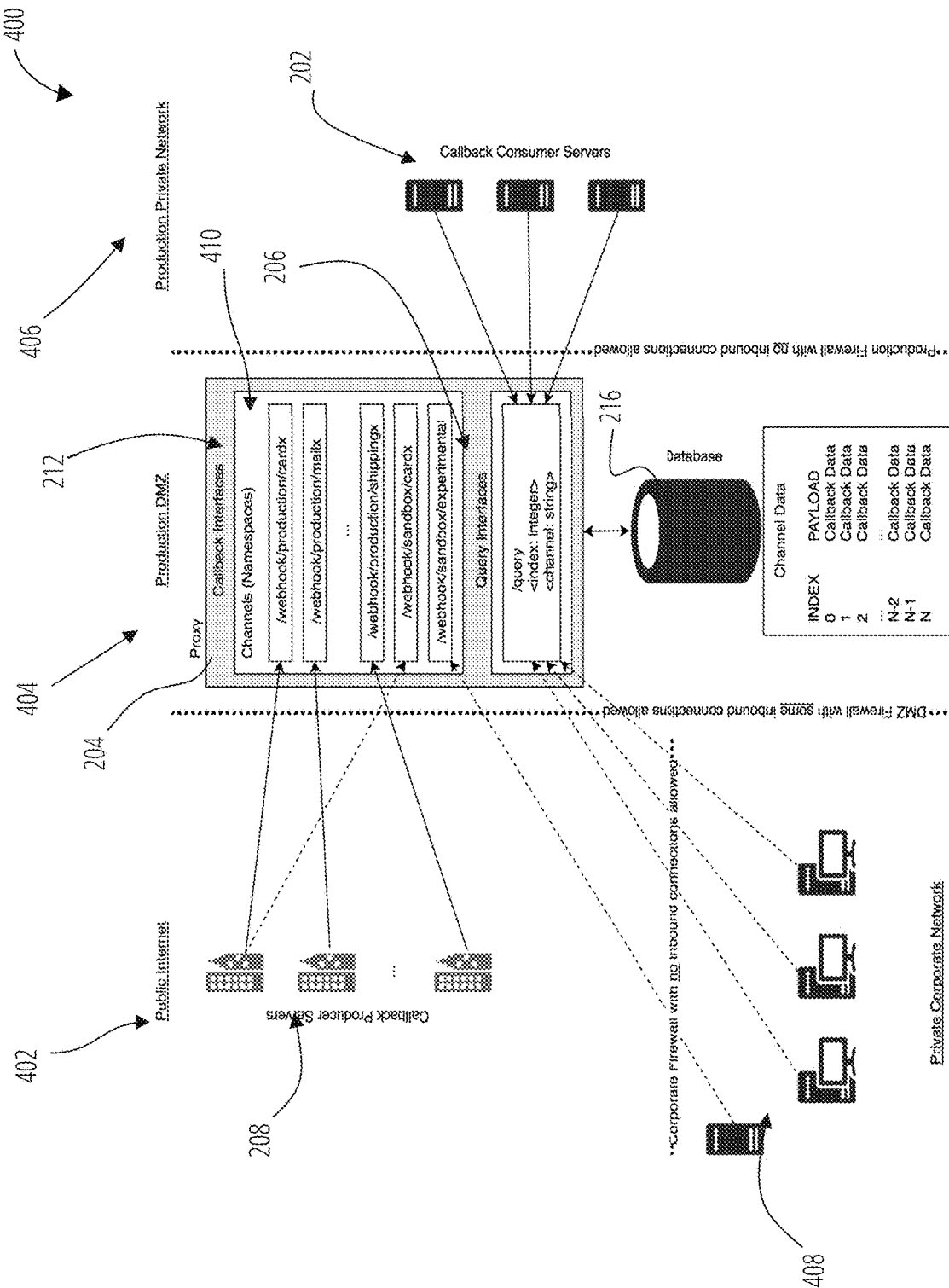
FIG. 4 illustrates an environment 400 in accordance with one embodiment.

FIG. 4 is a schematic diagram illustrating further details regarding example networked environment 400, which has a public network domain 402, a buffer domain 404 (e.g., a production demilitarized zone), a private network domain 406, and private corporate network domain 408. Multiple callback producer servers 208 are located within the public network domain 402 and communicate with the proxy server 204 through a firewall that allows certain limited inbound communications from the public network domain 402 to the buffer domain 404. Servers and client devices within the private corporate network domain 408 similarly communicate with the proxy server 204 through the firewall. The proxy server 204 provides at least one proxy callback interface 212 that is accessible via the firewall from the public network domain 402 and supports multiple webhook channels 410. Each webhook channel has an associated webhook channel address (or webhook channel identifier) in the form of a URL. The callback producer servers 208 operationally may issue HTTP post requests to each of these URLs.

As described with reference to FIG. 3, information received in an HTTP post request 302 is written to the proxy server database 216 and stored within a callback record 310 to include a sequence number 312, in the example form of an index number, and a payload 314, in the example form of callback data, for each received HTTP post request 302.

The proxy server 204 is also shown in FIG. 4 to include at least one proxy query interface 206, which is accessible by the callback consumer servers 202 via a production firewall, which allows no inbound communications from the public network domain 402. As described in further detail, each query received at a proxy query interface 206 from the callback consumer servers 202 includes both a polling sequence number (e.g., <index:integer>), as well as a webhook channel identifier (e.g., <channel:string>).

Machines within the private corporate network domain 408 are also able to query the proxy query interface 206 through the demilitarized zone firewall, with queries from these machines having the same format as those received from the callback consumer servers 202.

Figure 5:
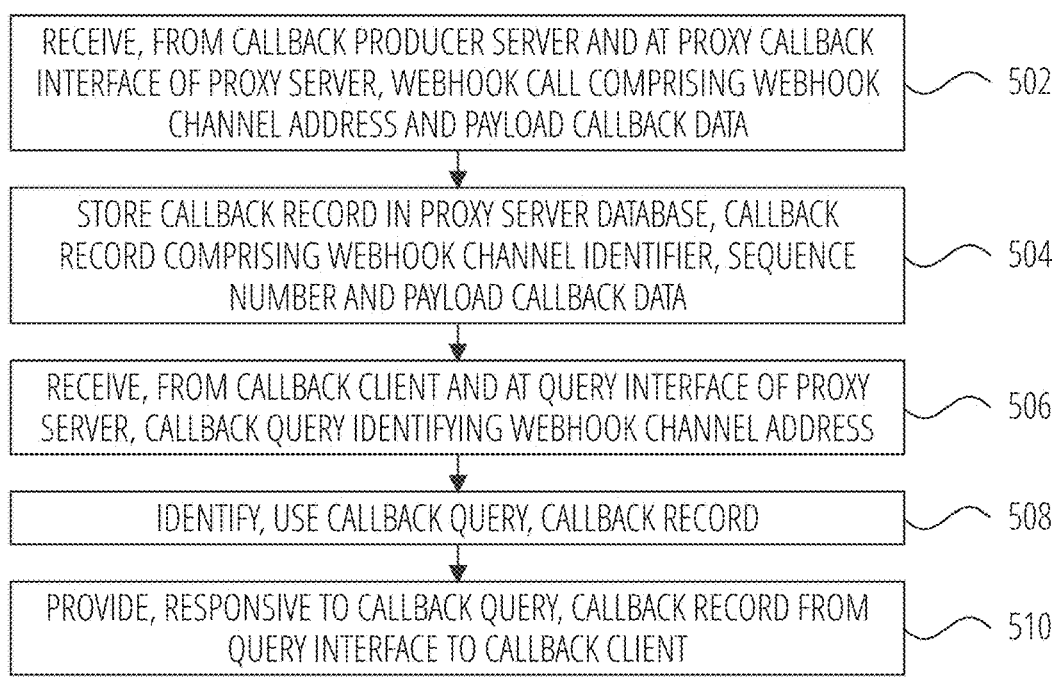
FIG. 5 illustrates a method 500 in accordance with one embodiment.

FIG. 5 is a flowchart illustrating a method 500, according to some example embodiments, of operating a proxy server (e.g., the proxy server 204) to handle webhook callbacks, as well as callback queries).

The method 500 commences at operation 502 with the receipt, from one or multiple callback producer servers 208, of a webhook call. The webhook call is received at the proxy server 204, specifically the proxy callback interface 212. Further, the webhook call includes a webhook a channel address (e.g., a URL 304), and payload callback data (e.g., payload 306).

At operation 504, the proxy server 204 parses the received webhook call, extracts data therefrom, and creates a callback record 310 including at least a sequence number 312 and a payload 314. The proxy server 204 then stores the callback record 310 in the proxy server database 216.

In one example embodiment, the callback record 310 may also include a webhook channel address channel identifier. Keep in mind that the proxy server 204, and specifically the proxy callback interface 212, may support multiple webhook channels, with each of these multiple webhook channels being identified by a respective webhook channel identifier or address. The webhook channel identifier may, for example, be the URL 304 of the respective webhook channel, or a derivative (e.g., hash) thereof.

In one embodiment, as described above with reference to FIG. 3, a dedicated channel table 308 may exist for each respective webhook channel, and callback records for webhook calls received on that channel may be stored in the appropriate channel table 308. In another embodiment, each callback record 310 may include a webhook channel identifier associated with the channel in which it is received.

At operation 506, the proxy server 204 receives, from a callback client 214 executing on a respective one of the callback consumer servers 202, a callback query. Specifically, the callback query may be issued, from a callback interface 220 of the callback client 214, to the proxy query interface 206 of the proxy server 204. The callback query may be issued from a callback client 214 in order to retrieve any new callback records received at a particular webhook channel since a last callback query. In a different use case scenario, the callback query may be part of a recovery operation, whereby callback consumer servers 202 are attempting to recover callback records within a certain time period or within a particular range.

The callback query includes a polling sequence number, in the example form of an index number that is an integer value that represents an index value of a sequentially lowest record that the callback client 214 is requesting be returned. The callback query, in addition to including the polling sequence number, also includes a webhook channel identifier to identify the respective webhook channel for which callback records are to be returned.

At operation 508, the proxy server 204, and specifically the proxy query interface 206, identifies one or more callback records to be returned to the callback client 214 responsive to the callback query. To this end, the proxy query interface 206 uses the polling sequence number included in the callback query to perform a lookup in the proxy server database 216, and identify all callback records having a sequence number 312 equal or greater than the polling sequence number in a channel table 308 identified using the webhook channel identifier included in the callback query. In the embodiment in which a single table is used to store all callback records, the webhook channel identifier may also be used, in conjunction with the polling sequence number, to identify callback records to be returned.

At operation 510, the proxy query interface 206 provides multiple callback records, associated with the relevant webhook channel and identified based on the polling sequence number, to the callback interface 220 of the callback client 214.

The above-described embodiment returns, responsive to a particular callback query, all callback records within a particular channel table 308, having a sequence number 312 greater than a polling sequence number included in the callback request.

In another embodiment, the callback interface 220 may issue multiple, and incremental, callback queries to retrieve individual callback records from within the proxy server database 216. For example, in this embodiment, the callback interface 220 may issue a sequence of callback queries, each including an incremented polling sequence number, responsive to which of the proxy query interface 206 performs a lookup within the proxy server database 216, and returns only the single callback record identified by the polling sequence number included in the respective callback record. Accordingly, in this embodiment, the callback interface 220 can request discrete sequences of callback records, as opposed to simply requesting all callback records subsequent to a particular polling sequence number.

In this embodiment, the proxy query interface 206 may also detect that a particular polling sequence number (e.g., a last-used polling sequence number) corresponds to a last sequence number 312 within a particular channel table 308 and, responsive to detecting this correspondence, performs a call termination action (e.g., providing a notification or a null response) back to the callback interface 220 in response to the callback query. In this way, the callback consumer servers 202 are advised of having received the sequentially last callback record within the relevant channel table 308.

In one example embodiment, the callback query may be a poll query that is used by the proxy query interface 206 to identify the polling sequence number and identify multiple callback records, associated with a particular webhook channel address and stored within the proxy server database 216, using the polling sequence number. To this end, the proxy query interface 206 may increment a received polling sequence number by one, to generate a refreshed polling sequence number, for which the corresponding callback record 310 is retrieved from the proxy server database 216. Having then retrieved this callback record, the proxy query interface 206 may again incremental the polling sequence number generate a refreshed sequence number, and then retrieve the next sequential callback record 310.

In an alternative embodiment, the callback query may include a timestamp identifying a time associated with a previous callback query. In this embodiment, the callback interface 220 or the proxy query interface 206 may store a timestamp associated with the last callback query provided from the callback interface 220 to the proxy query interface 206. The callback client 214, via the callback interface 220, issues a simple callback query identifying only the callback client 214 and the relevant webhook channel. The proxy query interface 206 then identifies any callback records, stored within the proxy server database 216 and received subsequent to the timestamp of the last previous callback query, and returns all such callback records. In this embodiment, the sequence number 312 associated with any callback record may itself be a timestamp (or otherwise embed time information) indicative of when the corresponding webhook call was received at the proxy server 204. In short, in this embodiment, as opposed to using sequence numbers which are incremented integers, the sequence number 312 may be a timestamp, and either the callback interface 220 or the proxy query interface 206 may store a timestamp of a last previous callback query. The proxy server 204 may identify all callback records stored within the proxy server database 216, for a particular webhook channel, subsequent to the last previous callback query.

It should further be noted that a particular one of the callback consumer servers 202 may store a last-used polling sequence number, which is communicated to the proxy server 204, in order to retrieve any callback records related to callbacks received since the callback identified by the last-used polling sequence number. In another embodiment, the proxy server 204 (and even more specifically, the proxy query interface 206) may store a last-used polling sequence number, in association with an identifier for a particular callback consumer server. In this embodiment, the callback client 214 simply issues an update request, together with an identifier, which is then used by the proxy query interface 2062 to look up a last-used polling sequence number, and then identify any callback records within the proxy server database 216 which need to be returned to the relevant callback client 214. As noted elsewhere herein, the polling sequence number may either be an integer value which is incremented, or a timestamp.

Figure 6:
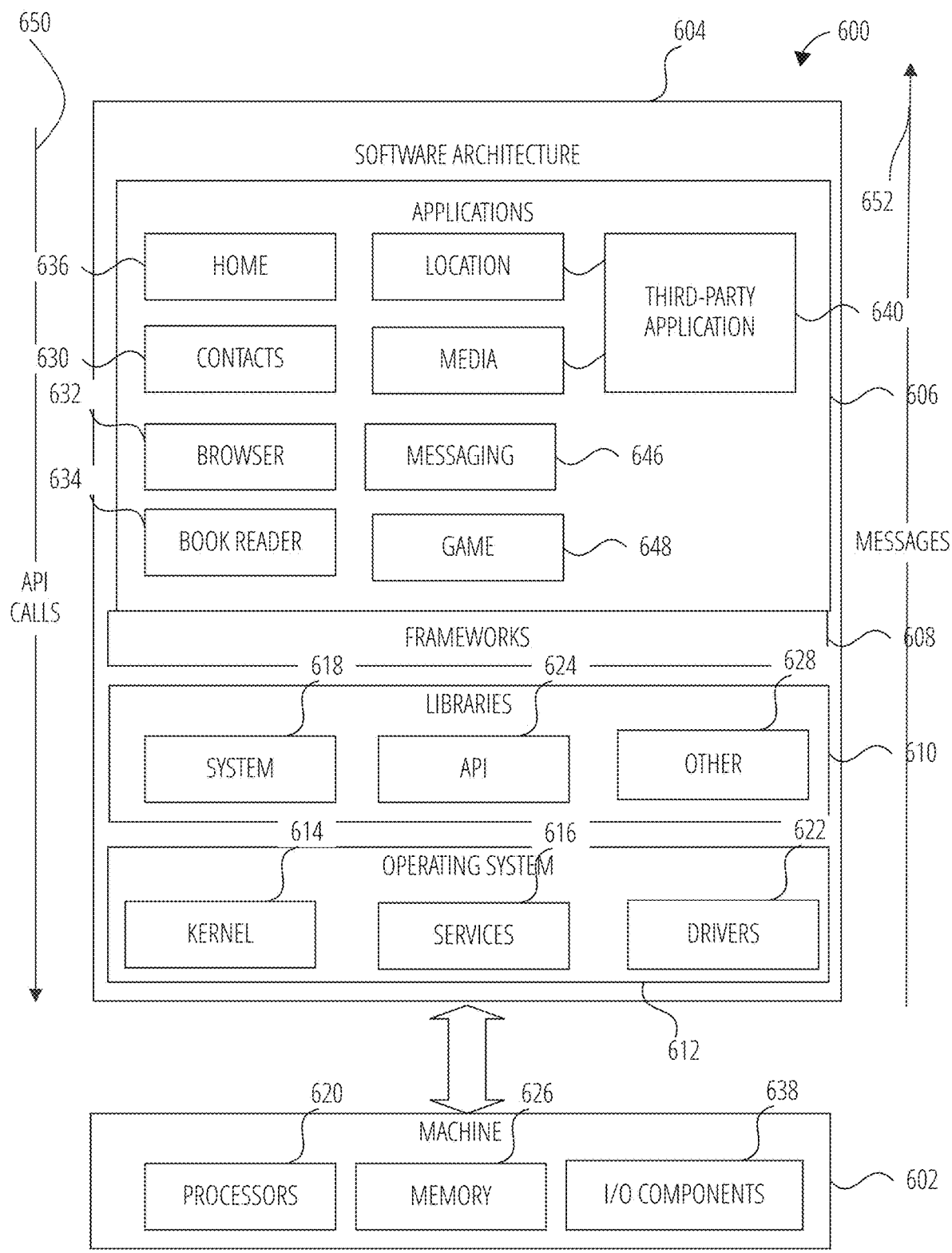
FIG. 6 is block diagram showing a software architecture within which the present disclosure may be implemented, according to an example embodiment.

FIG. 6 is a block diagram 600 illustrating a software architecture 604, which can be installed on any one or more of the devices described herein. The software architecture 604 is supported by hardware such as a machine 602 that includes processors 620, memory 626, and I/O components 638. In this example, the software architecture 604 can be conceptualized as a stack of layers, where each layer provides a particular functionality. The software architecture 604 includes layers such as an operating system 612, libraries 610, frameworks 608, and applications 606. Operationally, the applications 606 invoke API calls 650 through the software stack and receive messages 652 in response to the API calls 650.

The operating system 612 manages hardware resources and provides common services. The operating system 612 includes, for example, a kernel 614, services 616, and drivers 622. The kernel 614 acts as an abstraction layer between the hardware and the other software layers. For example, the kernel 614 provides memory management, processor management (e.g., scheduling), component management, networking, and security settings, among other functionality. The services 616 can provide other common services for the other software layers. The drivers 622 are responsible for controlling or interfacing with the underlying hardware. For instance, the drivers 622 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

The libraries 610 provide a common low-level infrastructure used by the applications 606. The libraries 610 can include system libraries 618 (e.g., C standard library) that provide functions such as memory allocation functions, string manipulation functions, mathematic functions, and the like. In addition, the libraries 610 can include API libraries 624 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 610 can also include a wide variety of other libraries 628 to provide many other APIs to the applications 606.

The frameworks 608 provide a common high-level infrastructure that is used by the applications 606. For example, the frameworks 608 provide various graphical user interface (GUI) functions, high-level resource management, and high-level location services. The frameworks 608 can provide a broad spectrum of other APIs that can be used by the applications 606, some of which may be specific to a particular operating system or platform.

In an example embodiment, the applications 606 may include a home application 636, a contacts application 630, a browser application 632, a book reader application 634, a location application 642, a media application 644, a messaging application 646, a game application 648, and a broad assortment of other applications such as a third-party application 640. The applications 606 are programs that execute functions defined in the programs. Various programming languages can be employed to create one or more of the applications 606, structured in a variety of manners, such as object-oriented programming languages (e.g., Objective-C, Java, or C++) or procedural programming languages (e.g., C or assembly language). In a specific example, the third-party application 640 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 640 can invoke the API calls 650 provided by the operating system 612 to facilitate functionality described herein.

Figure 7:
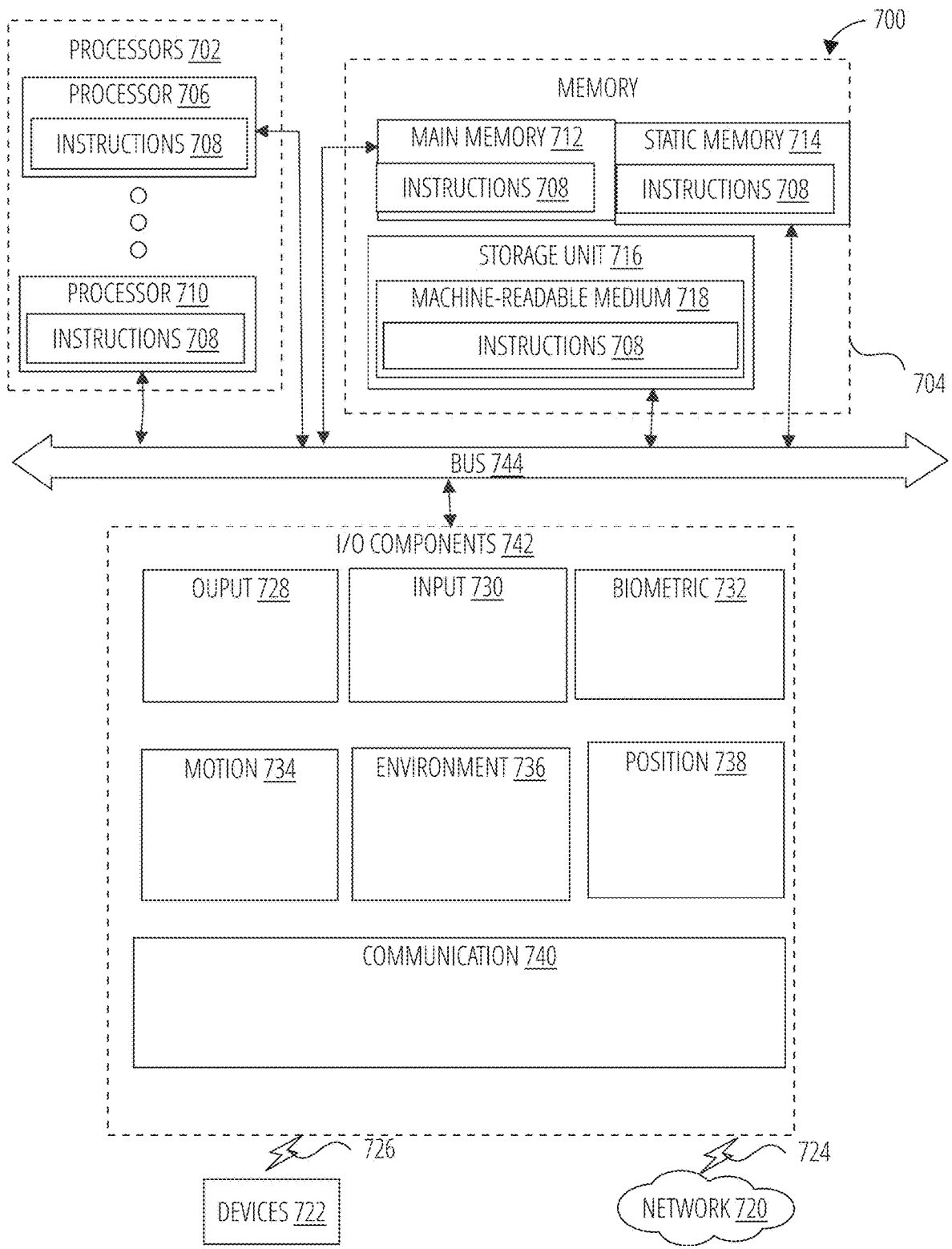
FIG. 7 illustrates a diagrammatic representation of a machine in the form of a computer system within which a set of instructions may be executed for causing the machine to perform any one or more of the methodologies discussed herein, according to an example embodiment.

FIG. 7 is a diagrammatic representation of the machine 700 within which instructions 708 (e.g., software, a program, an application, an applet, an app, or other executable code) for causing the machine 700 to perform any one or more of the methodologies discussed herein may be executed. For example, the instructions 708 may cause the machine 700 to execute any one or more of the methods described herein. The instructions 708 transform the general, non-programmed machine 700 into a particular machine 700 programmed to carry out the described and illustrated functions in the manner described. The machine 700 may operate as a standalone device or may be coupled (e.g., networked) to other machines. In a networked deployment, the machine 700 may operate in the capacity of a server machine or a client machine in a server-client network environment, or as a peer machine in a peer-to-peer (or distributed) network environment. The machine 700 may comprise, but not be limited to, a server computer, a client computer, a personal computer (PC), a tablet computer, a laptop computer, a netbook, a set-top box (STB), a PDA, an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 708, sequentially or otherwise, that specify actions to be taken by the machine 700. Further, while only a single machine 700 is illustrated, the term "machine" shall also be taken to include a collection of machines that individually or jointly execute the instructions 708 to perform any one or more of the methodologies discussed herein.

The machine 700 may include processors 702, memory 704, and I/O components 742, which may be configured to communicate with each other via a bus 744. In an example embodiment, the processors 702 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 706 and a processor 710 that execute the instructions 708. The term "processor" is intended to include multi-core processors that may comprise two or more independent processors (sometimes referred to as "cores") that may execute instructions contemporaneously. Although FIG. 7 shows multiple processors 702, the machine 700 may include a single processor with a single core, a single processor with multiple cores (e.g., a multi-core processor), multiple processors with a single core, multiple processors with multiples cores, or any combination thereof.

The memory 704 includes a main memory 712, a static memory 714, and a storage unit 716, both accessible to the processors 702 via the bus 744. The main memory 704, the static memory 714, and storage unit 716 store the instructions 708 embodying any one or more of the methodologies or functions described herein. The instructions 708 may also reside, completely or partially, within the main memory 712, within the static memory 714, within machine-readable medium 718 within the storage unit 716, within at least one of the processors 702 (e.g., within the processor's cache memory), or any suitable combination thereof, during execution thereof by the machine 700.

The I/O components 742 may include a wide variety of components to receive input, provide output, produce output, transmit information, exchange information, capture measurements, and so on. The specific I/O components 742 that are included in a particular machine will depend on the type of machine. For example, portable machines such as mobile phones may include a touch input device or other such input mechanisms, while a headless server machine will likely not include such a touch input device. It will be appreciated that the I/O components 742 may include many other components that are not shown in FIG. 7. In various example embodiments, the I/O components 742 may include output components 728 and input components 730. The output components 728 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 730 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 742 may include biometric components 732, motion components 734, environmental components 736, or position components 738, among a wide array of other components. For example, the biometric components 732 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 734 include acceleration sensor components (e.g., accelerometer), gravitation sensor components, rotation sensor components (e.g., gyroscope), and so forth. The environmental components 736 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 738 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 742 further include communication components 740 operable to couple the machine 700 to a network 720 or devices 722 via a coupling 724 and a coupling 726, respectively. For example, the communication components 740 may include a network interface component or another suitable device to interface with the network 720. In further examples, the communication components 740 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 722 may be another machine or any of a wide variety of peripheral devices (e.g., a peripheral device coupled via a USB).

Moreover, the communication components 740 may detect identifiers or include components operable to detect identifiers. For example, the communication components 740 may include Radio Frequency Identification (RFID) tag reader components, NFC smart tag detection components, optical reader components (e.g., an optical sensor to detect one-dimensional barcodes such as Universal Product Code (UPC) barcode, multi-dimensional bar codes such as Quick Response (QR) code, Aztec code, Data Matrix, Dataglyph, MaxiCode, PDF417, Ultra Code, UCC RSS-2D barcode, and other optical codes), or acoustic detection components (e.g., microphones to identify tagged audio signals). In addition, a variety of information may be derived via the communication components 740, such as location via Internet Protocol (IP) geolocation, location via Wi-Fi® signal triangulation, location via detecting an NFC beacon signal that may indicate a particular location, and so forth.

The various memories (e.g., memory 704, main memory 712, static memory 714, and/or memory of the processors 702) and/or storage unit 716 may store one or more sets of instructions and data structures (e.g., software) embodying or used by any one or more of the methodologies or functions described herein. These instructions (e.g., the instructions 708), when executed by processors 702, cause various operations to implement the disclosed embodiments.

The instructions 708 may be transmitted or received over the network 720, using a transmission medium, via a network interface device (e.g., a network interface component included in the communication components 740) and using any one of a number of well-known transfer protocols (e.g., hypertext transfer protocol (HTTP)). Similarly, the instructions 708 may be transmitted or received using a transmission medium via the coupling 726 (e.g., a peer-to-peer coupling) to the devices 722.

In conclusion, the above-described proxy server, in some example embodiments, seeks to address a number of the technical problems identified above that exist today with webhooks. Specifically, by storing callback records within the proxy server database 216, from which repeated retrieval attempts could be made by a callback client 214, the challenges presented by the "ephemeral" nature of callbacks can be mitigated. Specifically, if a callback client 214 fails or otherwise loses a notification message, it can make a repeat callback query, via the proxy server 204, to the proxy server database 216. Given that callback producer servers 104 typically do not repeat notifications of an event multiple times, this capability may be very useful where the reliability of a callback client 214 is compromised.

Some example embodiments described above may also be used to restore the state of a callback client 214 in such a way that the state includes the data for events (notified via callbacks) that may have occurred since a particular backup was made.

Further, if bugs or other technical problems exist with respect to a callback client, using the proxy server 204, it is possible to ineffective "replay" events in order to debug the callback client 214 or recover events.

Furthermore, the proxy server 204 is configurable to provide multiple callback endpoints to a callback producer (e.g., the callback producer servers at 208) behind the demilitarized zone firewall. Having multiple callback endpoints may make it easier for a producer to reach an endpoint successfully, and deliver an event notification message (e.g., a callback).

What is claimed is:

1. A proxy server comprising:
a proxy callback interface to receive a webhook call from a callback producer server of a web service, the webhook call including a webhook channel address and payload callback data;
a database interface to store a callback record comprising the payload callback data in a proxy server database; and
a query interface to receive a callback query from a callback consumer server, the callback query identifying the webhook channel address, the query interface further to:
identify a plurality of callback records associated with the webhook channel address stored within the proxy server database subsequent to receipt of a previous callback query from the callback consumer server, and
return the plurality of callback records to the callback consumer server, responsive to the callback query,
wherein the callback query includes a timestamp identifying a time associated with the previous callback query, and the query interface is to store the timestamp identifying the time associated with the previous callback query.

2. The proxy server of claim 1, wherein the callback query is a poll query that is used by the query interface to identify a polling sequence number, and wherein the query interface is to identify the plurality of callback records, associated with the webhook channel address and stored within the proxy server database, using the polling sequence number.

3. The proxy server of claim 2, wherein the polling sequence number is included in the poll query.

4. The proxy server of claim 2, wherein the polling sequence number is stored by the query interface, and is identified using an identifier associated with the callback consumer server.

5. The proxy server of claim 1, wherein the proxy callback interface includes a plurality of webhook channels, each channel of the plurality of webhook channels being identified by a respective webhook channel address.

6. The proxy server of claim 1, wherein the query interface includes a dedicated endpoint associated with the callback consumer server, the callback query being received at the dedicated endpoint.

7. The proxy server of claim 6, wherein the query interface includes a plurality of dedicated endpoints associated with respective ones of a plurality of callback consumer servers, and wherein the query interface is to dynamically rotate the plurality of dedicated endpoints in order to provide additional security.

8. A method comprising:
storing a callback record in a proxy server database accessible by a proxy server, the callback record comprising payload callback data previously received in a webhook call comprising a webhook channel address and the payload callback data;
receiving, at a query interface of the proxy server, a callback query identifying the webhook channel address;
identify, using the callback query, a plurality of callback records associated with the webhook channel address stored within the proxy server database subsequent to receipt of a previous callback query received from a callback client; and
providing, responsive to the callback query, the plurality of callback records from the query interface to the callback client,
wherein the callback query includes a timestamp identifying a time associated with the previous callback query, and the query interface is to store the timestamp identifying the time associated with the previous callback query.

9. The method of claim 8, wherein the callback query includes a polling sequence number, and the method includes using the polling sequence number to identify the callback record.

10. The method of claim 9, including identifying, using the query interface, the plurality of callback records as being associated with the webhook channel address based on the polling sequence number, and providing, responsive to the callback query, the plurality of callback records from the query interface to the callback client.

11. The method of claim 10, wherein the providing of the plurality of callback records includes identifying callback records having a respective index a value greater than the polling sequence number.

12. The method of claim 8, wherein the proxy server supports a plurality of webhook channels, each channel of the plurality of webhook channels being identified by a respective webhook channel address, the method further including identifying a specific webhook channel from among the plurality of webhook channels based on the webhook channel address included in the webhook call.

13. The method of claim 12, wherein the callback record comprises a webhook channel identifier identifying the specific webhook channel.

14. The method of claim 13, wherein the storing of the callback record includes storing the callback record in a callback table associated with the specific webhook channel.

15. A computing apparatus, the computing apparatus comprising:
  a processor; and
  a memory storing instructions that, when executed by the processor, configure the computing apparatus to:
  receive, from a callback producer machine and at a proxy callback interface of a proxy server, a webhook call comprising a webhook channel address and payload callback data;
  store a callback record in a proxy server database, the callback record comprising the payload callback data;
  receive, from a callback consumer machine and at a query interface of the proxy server, a callback query identifying the webhook channel address;
  identify, use the callback query, a plurality of callback records associated with the webhook channel address stored within the proxy server database subsequent to receipt of a previous callback query from the callback consumer machine; and
  provide, responsive to the callback query, the plurality of callback records from the query; interface to the callback consumer machine,
  wherein the callback query includes a timestamp identifying a time associated with the previous callback query, and the query interface is to store the timestamp identifying the time associated with the previous callback query.

16. A non-transitory computer-readable storage medium, the computer-readable storage medium including instructions that when executed by a computer, cause the computer to:
  receive, from a callback producer server and at a proxy callback interface of a proxy server, a webhook call comprising a webhook channel address and payload callback data;
  store a callback record in a proxy server database, the callback record comprising the payload callback data;
  receive, from a callback client and at a query interface of the proxy server, a callback query identifying the webhook channel address;
  identify, use the callback query, a plurality of callback records associated with the webhook channel address stored within the proxy server database subsequent to receipt of a previous callback query from the callback client; and
  provide; responsive to the callback query, the plurality of callback records from the query interface to the callback client,
  wherein the callback query includes a timestamp identifying a time associated with the previous callback query, and the query interface is to store the timestamp identifying the time associated with the previous callback query.

* * * * *